United States Patent [19]

Segawa

[11] Patent Number: 5,506,707
[45] Date of Patent: Apr. 9, 1996

[54] ELECTRODE SUBSTRATE HAVING DOUBLE LAYERS OF INDIUM TIN OXIDE AND METHOD FOR MAKING THE SAME

[75] Inventor: Yuji Segawa, Kanagawa, Japan

[73] Assignee: Sony Corporation, Tokyo, Japan

[21] Appl. No.: 281,590

[22] Filed: Jul. 28, 1994

[30] Foreign Application Priority Data

Jul. 30, 1993 [JP] Japan ................... 5-208631

[51] Int. Cl.[6] ................. G02F 1/1343; G02F 1/1333
[52] U.S. Cl. ................. 359/87; 359/79; 359/74
[58] Field of Search ................. 359/87, 79, 67, 359/68, 74; 430/7, 20; 427/126.3, 124

[56] References Cited

U.S. PATENT DOCUMENTS

4,853,296  8/1989  Fukuyoshl ................. 359/87
5,212,575  5/1993  Kojima ................. 359/87
5,289,300  2/1994  Yamazaki ................. 359/87
5,329,390  7/1994  Fujiwara ................. 359/67

Primary Examiner—Anita Pellman Gross
Assistant Examiner—Tsep H. Nguyen
Attorney, Agent, or Firm—Hill, Steadman & Simpson

[57] ABSTRACT

An electrode substrate for display devices comprises a builtup structure having a resin layer 1, an underlying layer 2 and a pattern of a conductive layer superposed in this order. The underlying layer consists of a $SiO_2$ film 8 formed by sputtering. The conductive layer 3 consists of a double-layer structure including a first ITO film 9 formed by low temperature sputtering and a second ITO film 10 formed by high temperature sputtering. The $SiO_2$ film has an internal stress close to zero. The first ITO film 9 has an internal stress in tension and the second ITO film has an internal stress in compression counterbalancing the internal stress in tension therewith. Thus, the builtup structure permits the internal stresses involved in the substrate to be relaxed.

8 Claims, 6 Drawing Sheets

ELECTRODE SUBSTRATE HAVING DOUBLE LAYERS OF INDIUM TIN OXIDE AND METHOD FOR MAKING THE SAME

BACKGROUND OF THE INVENTION

This invention relates to an electrode substrate for use in display devices. More particularly, the invention relates to an electrode substrate having a builtup structure capable of mitigating or relaxing an internal stress involved therein and also to a method for making such an electrode substrate.

Figure 8:
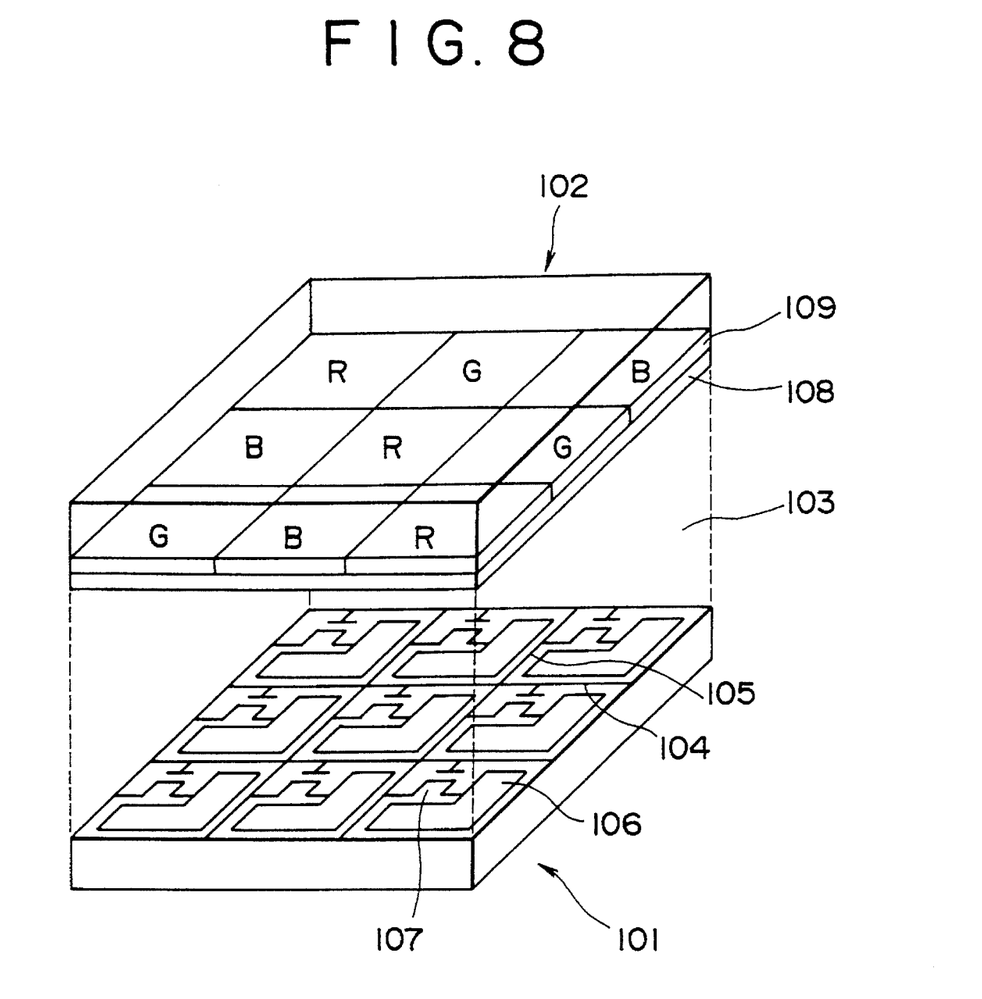
FIG. 8 is a schematic view of a general arrangement of a known active matrix-type liquid crystal display device.

Recently, there have been extensively developed display devices which have a flat panel structure made of a pair of electrode substrates mutually bonded together. A typical structure of an active matrix-type liquid crystal display device is shown in FIG. 8. As shown, the liquid crystal display device has a flat panel structure having a pair of electrode substrates bonded through a given gap therebetween. For convenience' sake, one of the electrode substrates is called a drive substrate 101 and the other electrode substrate is called a counter substrate 102. A liquid crystal 103 is provided between both substrates 101 and 102. The drive substrate 101 has on the inner surface thereof scanning lines 104 and signal lines 105 arranged as intersecting in the form of matrices. Pixel electrodes 106 are formed at individual intersections. Each pixel electrode 106 is made of a transparent conductive film such as ITO (composite oxide of indium and tin) which has been patterned in a desired form. Thin film transistors (TFT) 107 for switching drive are formed corresponding to individual pixel electrodes 106. The drain electrode of each TFT 107 is connected to a corresponding pixel electrode 106 and the source electrode is connected to a corresponding signal line 105. The gate electrode is connected to a corresponding scanning line 104. On the other hand, the counter substrate 102 has on the inner surface thereof a counter electrode 108 and a color filter film 109 superposed as shown. The counter electrode 108 is similarly made such as of ITO and forms a pixel in combination with individual pixel electrode 106. The color filter film 109 is divided into segments of red-green-blue (RGB) primaries.

Figure 9:
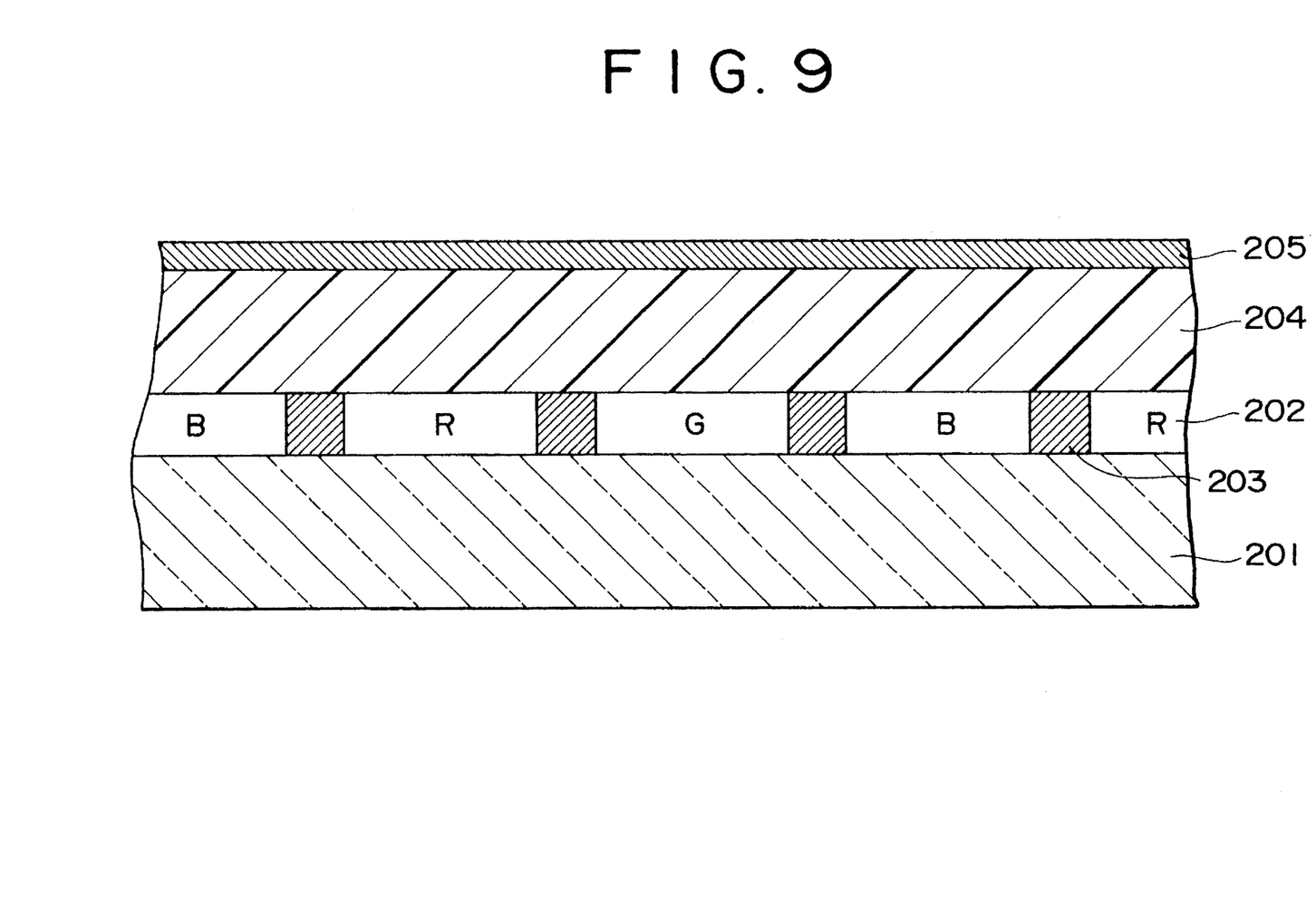
FIG. 9 is a sectional view of an electrode substrate for the known display device.

FIG. 9 is a schematic sectional view showing the structure of the counter electrode of FIG. 8. The counter electrode has a glass substrate 201 and a color filter film 202 formed on one side of the substrate 201. The color filter film 202 is divided into the segments of the RGB primaries with black masks 203 being formed at boundaries of the respective segments and each serving as a light-shielding region. A flattened film 204 made of a transparent resin layer is formed on the color filter film 202, on which a counter electrode 205 made of an ITO film is further formed. The ITO film may be patterned in a desired form, if necessary.

For the patterning of the ITO film, etching and resist releasing steps are necessary. In these steps, an acid or alkaline solution is used, which may sometimes result in swelling of the flattened film 204. If the flattened film 204 is swollen, the ITO film being patterned becomes irregular at edge portions thereof as penetrated, with the possibility that defects such as film breakage take place. To avoid this, an underlying layer such as an inorganic $SiO_2$ film may be provided between the ITO film and the flattened film 204. However, the provision of the $SiO_2$ film results in the formation of a two-layered inorganic film structure on the flattened film 204. This will present the problem that the counter electrode 205 suffers separation or cracking owing to the internal stress of the individual films.

It is the usual practice to prevent the separation or cracking by properly selecting film-forming conditions such that the internal stresses of the $SiO_2$ film and the ITO film, respectively, become close to zero. Alternatively, when the $SiO_2$ film is internally stressed in tension, for example, film-forming conditions for the ITO film are so selected as to have an internal stress of compression. With the ITO film, however, the film quality is greatly influenced by the film-forming conditions. For instance, where the ITO film is deposited by sputtering, there may not be obtained a film of a uniform quality depending on a slight difference in the condition of contamination or target. Accordingly, in an actual fabrication process, it is difficult to invariably keep optimum film-forming conditions of ITO, resulting in complicated working operations.

In view of the fabrication process and reliability, it is easy and convenient to form, on a glass substrate, an ITO film and then a color filter film in this order. However, such an arrangement as set out above has the color filter film made of a dielectric material between the ITO film and the liquid crystal. This is not advantageous in view of working performance of the device. Especially, with high-duty drive color liquid crystal display devices, it is essential to use a structure which includes an ITO film formed on a color filter film. The reasons for this are as follows. First, in a twist nematic mode or super-twist nematic mode, the anisotropy of dielectric constant of the liquid crystal ($\Delta\epsilon$) is positive, so that the electric capacitance of a liquid crystal pixel changes between the on and off voltages. Accordingly, with the builtup structure of the color filter film on the ITO film, the on/off voltage ratio to be applied to the liquid crystal becomes considerably worsened, bringing about a lowering of contrast. Second, if a color filter film is formed on an ITO film, a voltage drop takes place. This requires a drive voltage to be set at a higher level in order to compensate for the voltage drop.

The problems of the prior art have been set out with respect to the counter substrate of the active matrix-type liquid crystal display device. These problems are not inherent to the counter substrate alone but are common to electrode substrates for display devices which include builtup structures having a resin layer, an underlying layer and a conductive layer formed in this manner. More particularly, in the known electrode substrate structures, there arises the problem that these structures suffer separation or cracking owing to the internal stresses exerted on the underlying layer and the conductive layer.

SUMMARY OF THE INVENTION

An object of the invention is to provide an electrode substrate for display devices which has an internal stress-relaxing or mitigating structure whereby the problems of the prior art can be overcome.

Another object of the invention is to provide a method for making an electrode substrate of the type mentioned above.

According to one embodiment of the invention, there is provided an electrode substrate which is adapted for use in a liquid crystal display device, the substrate comprising:

a resin layer;

a $SiO_2$ underlying layer formed on the resin layer by sputtering; and a conductive layer formed on the underlying layer in a pattern, the conductive layer having a double-layer structure which includes a first indium tin oxide (ITO)

film formed by low temperature sputtering and a second ITO film formed by high temperature sputtering.

As will be apparent from the above, the electrode substrate of the invention includes a builtup structure having a resin layer, an underlying layer and a pattern of a conductive layer superposed in this order. The underlying layer consists of a $SiO_2$ film formed by sputtering. The invention is characterized in that the conductive layer has a double-layer structure made of a first ITO film formed by low temperature sputtering and a second ITO film formed by high temperature sputtering. Structurally, the $SiO_2$ film has an internal stress which is close to zero and the first ITO film has a given internal stress in tension involved therein. The second ITO film is controlled to have an internal stress in compression corresponding to and thus offsetting the internal stress in tension of the first ITO film. The electrode substrate having such a structure as set out above is applicable as an electrode substrate for display devices such as, for example, a counter substrate for full color liquid crystal display devices. In the case, the counter substrate comprises a glass substrate and the resin layer serves as a flattened film covering a color filter film therewith. Of course, the electrode substrate of the invention may also be applied as a counter substrate for mono-color liquid crystal display devices. In this case, the counter substrate includes a glass substrate formed with a metallic film serving as a black mask and the resin layer serves as an insulating film covering a metal film therewith. The structure of the invention can be applied to a plastic substrate for display devices. The plastic substrate is more advantageous in cost and handling than the glass substrate. Tot his end, the resin layer is made thick enough to serve as the plastic substrate, on which the first and second ITO films are formed through the underlying layer consisting of a $SiO_2$ film.

According to another embodiment of the invention, there is also provided a method for making an electrode substrate for display devices, the method comprising the steps of:

forming an underlying layer made of a $SiO_2$ film on a resin layer by sputtering;

forming a first indium tin oxide film on said underlying layer by low temperature sputtering;

further forming a second indium tin oxide film on the first indium tin oxide film by high temperature sputtering, thereby forming a conductive layer having a double-layered structure; and subjecting the conductive layer to patterning in a desired form to form transparent electrodes.

In the method for making the electrode substrate for display devices which comprises a resin layer, an underlying layer and a conductive layer, the underlying layer formation step is first effected wherein the underlying layer consisting of a $SiO_2$ film is formed on the resin layer by sputtering. Then, the low temperature sputtering step is performed wherein the first ITO film is formed on the $SiO_2$ film by low temperature sputtering. Subsequently, the high temperature sputtering step is performed wherein the second ITO film is formed to provide a conductive layer having a composite or double-layer structure. Finally, the patterning step is performed wherein the conductive layer is patterned in a desired form to provide transparent electrodes. Preferably the low and high sputtering steps are conducted under film-forming gas pressure conditions in the order of magnitude of $10^{-3}$ Torr. The low temperature sputtering is performed at normal temperatures and the high temperature sputtering is performed under film-forming temperature conditions of approximately 250° C.

According to the invention, the conductive layer has a double-layer structure, not a single-layer structure as in prior art, and has a first ITO film formed by low temperature sputtering and a second ITO film formed by high temperature sputtering and superposed thereon. In a condition after completion of the second ITO film, the first ITO film has a given internal stress in tension and the second ITO film has a given internal stress in compression. By optimizing the film-forming conditions, it becomes possible that the internal stresses in tension and compression are substantially at the same level and can thus be offset. Likewise, the $SiO_2$ film which is used as the underlying layer intervening between the resin layer and the conductive layer is sputtered under optimum sputtering conditions, by which the internal stress of the film can be approached to zero. Thus, in view of the builtup structure as a whole, the internal stresses of the respective layers or films are in a relaxed condition, thus effectively preventing the structure from cracking or separation.

PREFERRED EMBODIMENTS OF THE INVENTION

Figure 1:
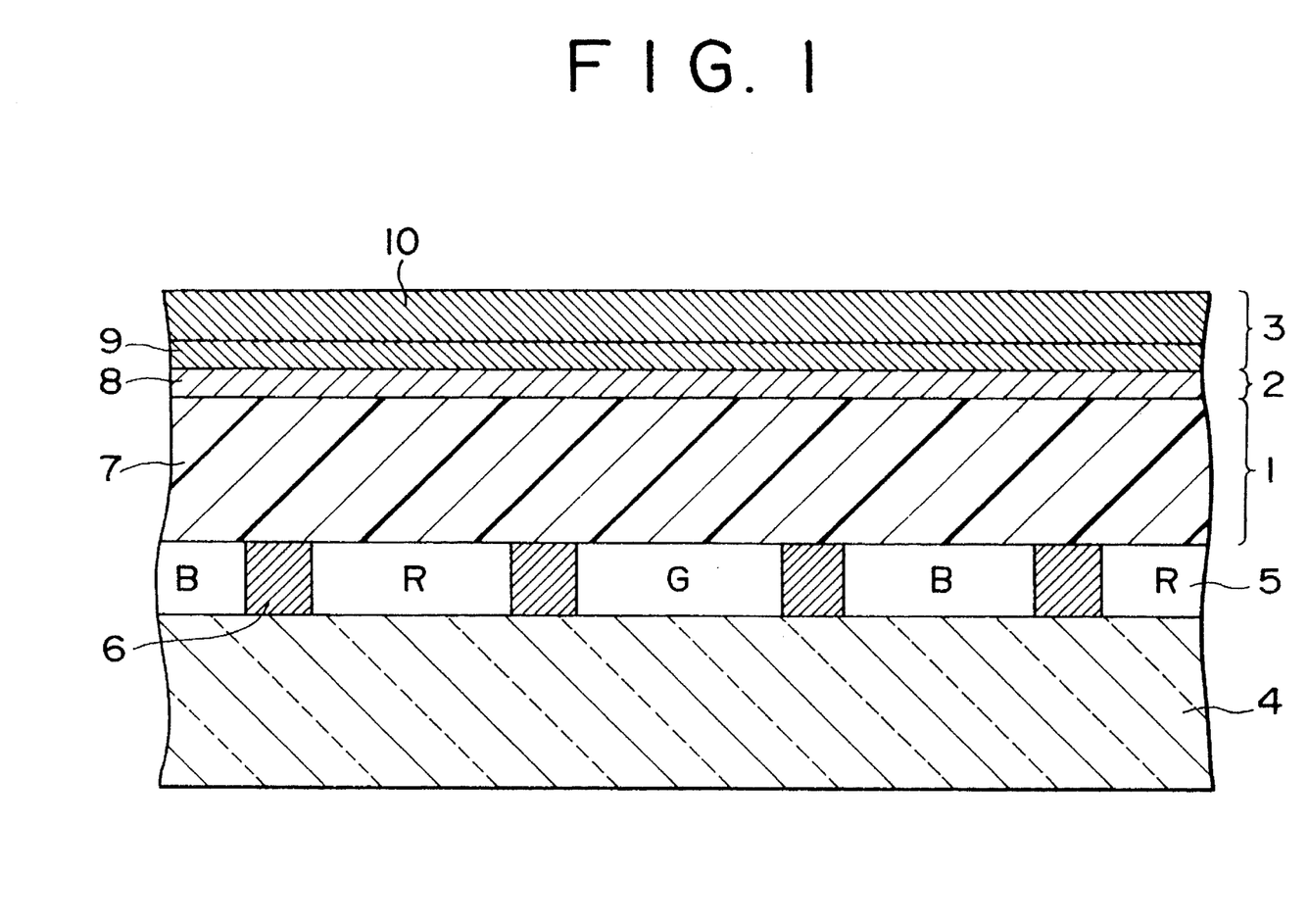
FIG. 1 is a sectional view showing an electrode substrate for display devices according to one embodiment of the invention.

Reference is now made to the accompanying drawings and particularly to FIG. 1 showing an electrode substrate according to an embodiment of the invention. In this embodiment, the electrode substrate is applied as a counter substrate of a color active matrix-type liquid crystal display device. As shown in the figure, the electrode substrate includes a builtup body having a resin layer 1, an underlying layer 2 and a conductive layer 3 superposed in this order. In this embodiment, a glass substrate 4 is also included on which a color filter film 5 is formed. The color filter film 5 is divided into segments for RGB primaries and a black mask 6 is formed at each boundary between adjacent segments. The resin layer 1 functions as a flattened film 7 covering the color film 5 therewith and is made, for example, a transparent resin.

The present invention is characterized in that the underlying layer 2 is made of a $SiO_2$ film formed by sputtering and that the conductive layer is composed of a double-layer or composite layer structure which has a first ITO film 9 formed by low temperature sputtering and a second ITO film 10 formed by high temperature sputtering. The $SiO_2$ film 8 has an internal stress close to zero. The first ITO film 9 has a given internal stress in tension. The second ITO film 10 has an internal stress of compression sufficient to offset the internal stress in tension.

The fabrication of the electrode substrate for display devices shown in FIG. 1 is described. Initially, a glass substrate 4 having a color filter film 5 on the surface thereof is first provided, on which a transparent resin is applied by spin coating or printing and fired to form a flattened film 7. Then, an underlying step is performed wherein a $SiO_2$ film is formed on the flattened film 7 to form an underlying layer. A low temperature sputtering step follows wherein a first ITO film 9 is formed on the $SiO_2$ film 8 by low temperature sputtering. Subsequently, a high temperature sputtering step is performed wherein a second ITO film 10 is formed on the first ITO film 9 by high temperature sputtering to provide a conductive layer 9 having a double-layer structure. Finally, a patterning step is effected wherein the conductive layer 3 is subjected to patterning in a desired form to formed a transparent counter electrode. The counter electrode may be patterned in a solid form. In this case, the patterning step is as follows: the conductive layer 3 is removed only from the peripheries of the substrate by etching. In addition, there may be used a pattern which has a plurality of divided regions for use as a counter electrode. Where the electrode substrate is used for a simple matrix-type liquid crystal display device, the conductive layer 3 is patterned in the form of stripes. In the above method, it is preferred that the low and high temperature sputtering steps are both performed under film-forming gas pressure conditions in the order of magnitude of $10^{-3}$ Torr. It is also preferred that the low temperature sputtering is performed at normal temperatures and the high temperature sputtering is performed at approximately 250° C.

Figure 2:
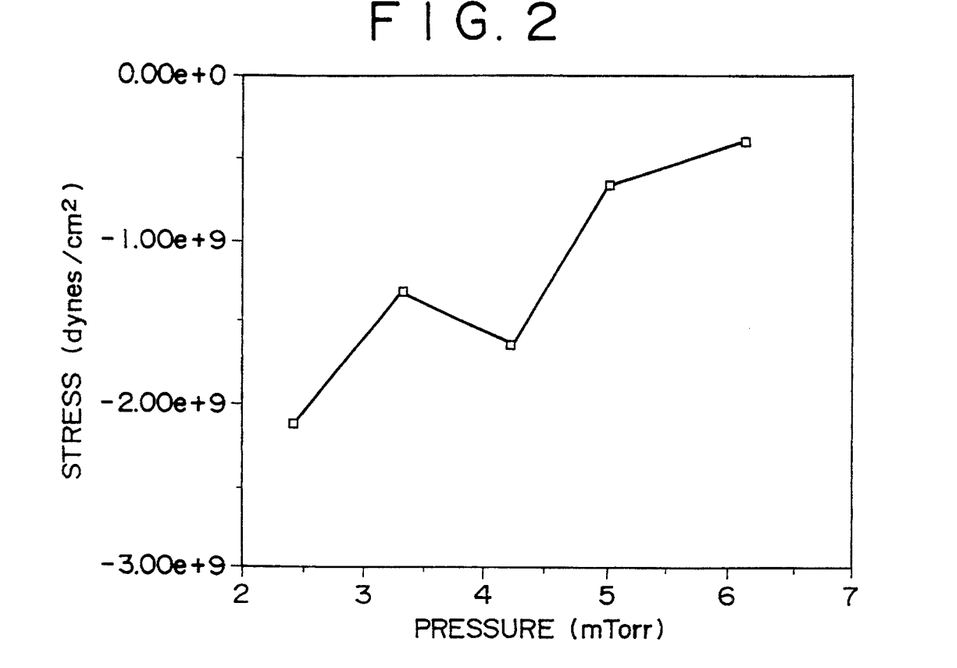
FIG. 2 is a graph showing the relation between the film stress and the film-forming gas pressure for $SiO_2$ film.

Reference is then made to FIGS. 2 to 5 in order to explain the internal stresses of the $SiO_2$ film 8, first ITO film 9 and second ITO film 110 in more detail. The $SiO_2$ film is formed, for example, by sputtering at normal temperatures in a thickness of approximately 0.05 μm. In the case, the $SiO_2$ film generally involves an internal stress of compression therein after the sputtering as shown in FIG. 2. The degree of the stress is dependent on the gas pressure used and the stress comes closer to zero as the gas pressure at the time of the sputtering increases.

Figure 3:
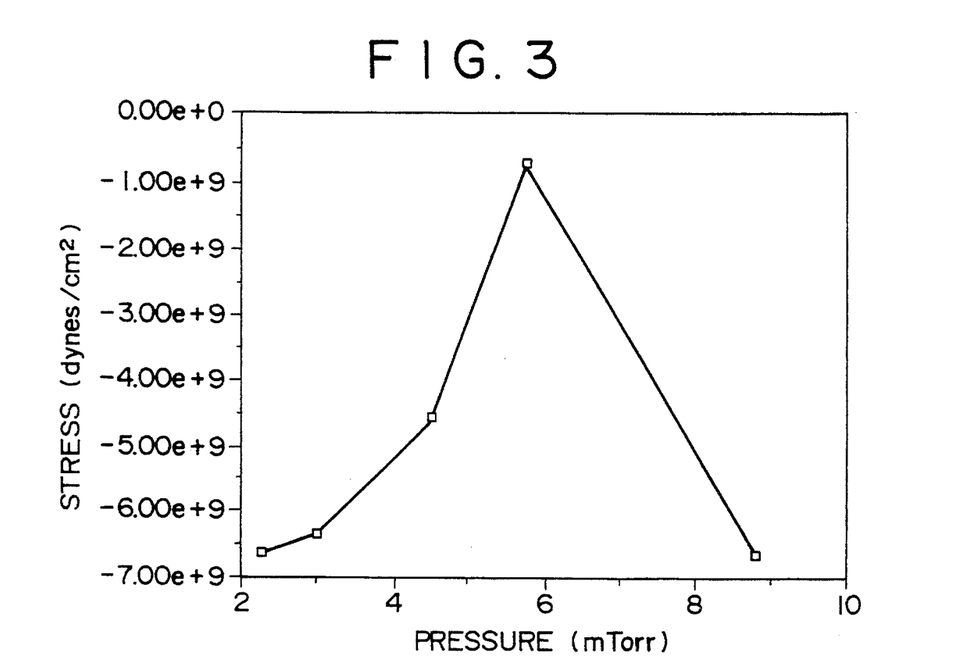
FIG. 3 is a graph showing the relation between the film stress and the film-forming gas pressure for the ITO film formed by high temperature sputtering.

The second ITO film 10 is formed at a high temperature of approximately 250° C., to which the color filter film is resistant, in order to establish a low resistance thereof. The film 10 has a thickness of approximately 0.2 μm and a sheet resistance of approximately 10Ω/□. As shown in FIG. 3, the second ITO film has a stress of compression therein, and its value comes close to zero in the vicinity of the sputtering gas pressure of 6 mTorr. As shown in FIGS. 2 and 3, the $SiO_2$ film and the second ITO film formed at relatively high temperatures both have a stress of compression therein, under which the ITO film may suffer separation or cracking by the influence of the stresses. To avoid this, it may occur that film-forming conditions for both $SiO_2$ and ITO are so selected to make a stress of compression substantially at zero. However, within a practical range of the gas pressure where film formation by sputtering at certain temperatures is possible, the stress in compression is inevitably involved in the $SiO_2$ and ITO films. As stated hereinbefore, the film quality of ITO is very likely to change depending on the film-forming conditions, with its control being very difficult. Accordingly, it has been actually difficult to mitigate the internal stress only by simple control of the film-forming conditions.

Figure 4:
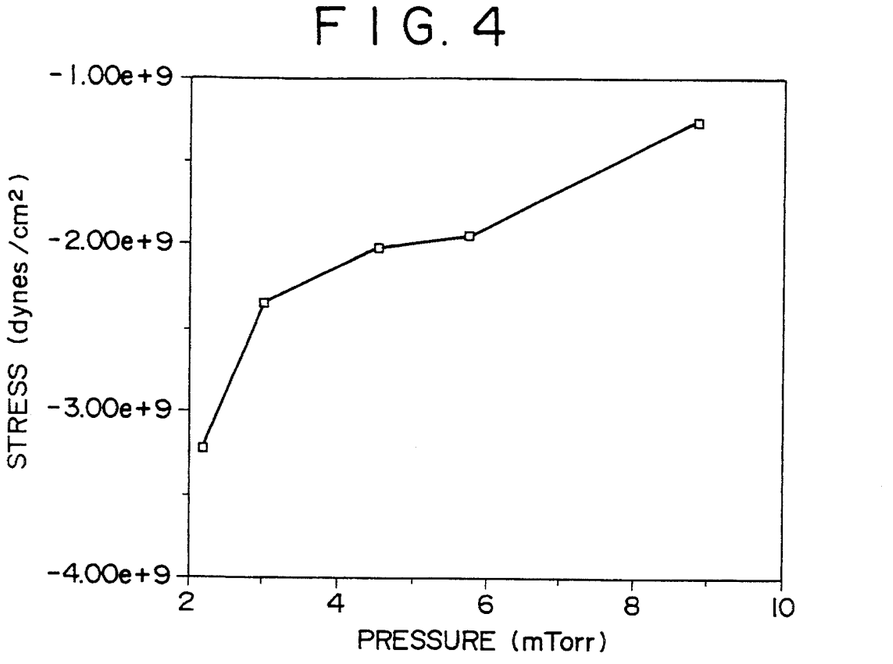
FIG. 4 is a graph showing the relation between the film stress and the film-forming gas pressure for the ITO film formed by normal temperature sputtering.

In the practice of the invention, it is essential to provide the first ITO film formed at low temperatures between the underlying $SiO_2$ film and the second ITO film formed at high temperatures. Since the film stress is usually smaller when the thickness is smaller, the first ITO film in this embodiment is formed in a thickness, for example, of 0.05 μm. The film formation temperature is set at normal temperatures (25° C.). The first ITO film formed at normal temperatures serves as a stress relaxing or mitigating layer between the $SiO_2$ film and the second ITO film formed at high temperatures. The stress of the ITO single layer formed by low temperature sputtering is shown in FIG. 4. At the stage where sputtered, the first ITO film involves a stress in compression with a gas pressure range where film formation is possible. As set out hereinbefore, the second ITO film is formed at high temperatures on the first ITO film formed at normal temperatures. Where film formation is effected at high temperatures, it is usual to pre-heat the substrate within a vacuum chamber, for example, for about 20 minutes in order to keep the substrate temperature at a predetermined film-forming level. Hence, the first ITO film formed at normal temperatures is heated and its phase is changed from amorphous to crystalline. In general, ITO is crystallized at temperatures not lower than 200° C.

Figure 5:
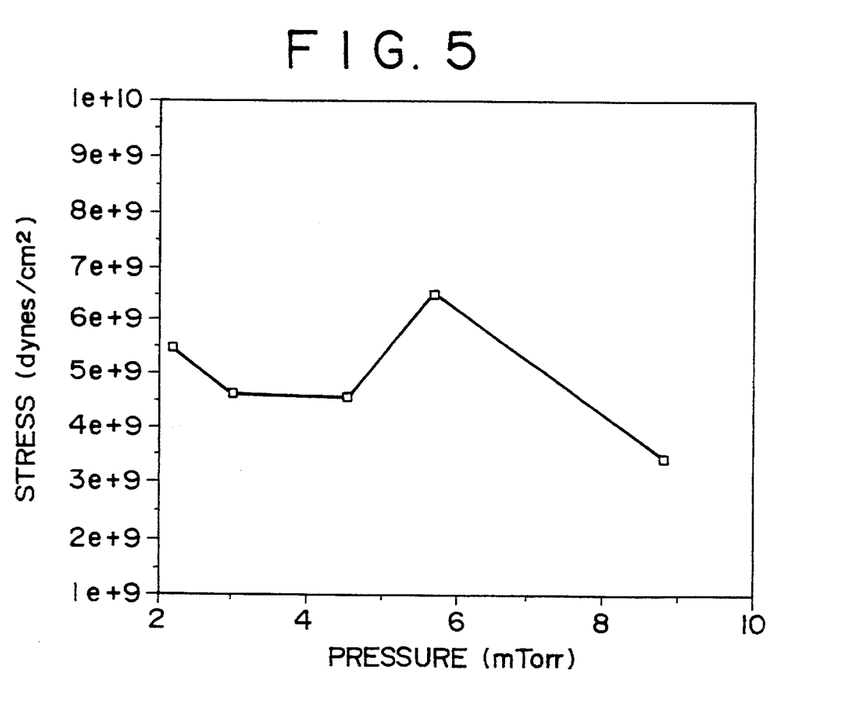
FIG. 5 is a graph showing the relation between the film stress and the film-forming gas pressure of the ITO film subjected to after-heating treatment after normal temperature sputtering.

The film stress is changed as a result of the crystallization. As shown in FIG. 5, the first ITO film is changed from the stress in compression to the stress in tension. In the graph, the stress in tension is expressed in terms of positive value and the stress in compression is expressed by negative value. As will be apparent from FIG. 5, the value of the stress in tension is less dependent on the gas pressure and is in the range, for example, of $3 \times 10^9$ to $6 \times 10^9$ dynes/cm$^2$, with the variation being not substantial. In general, when crystallized, ITO is exerted with a stress in tension and carriers such as electrons are more likely to move, with a lowering of resistance. On the other hand, the $SiO_2$ film undergoes little variation in the stress when heated and thus, it is not necessary to take the influence of the heating into consideration.

From the above results, it has been found that when film-forming conditions are optimally controlled, the ITO film or films can be effectively prevented from separation or cracking owing to the adverse influence of the film stresses. The underlying $SiO_2$ film is formed under conditions where the film-forming gas pressure is so set that the stress of the resultant film is close to zero. With the case of FIG. 2, the sputtering gas pressure is set at approximately 6 mTorr. With respect to the first ITO film formed at normal temperatures, the film-forming conditions are so set that the stress in tension is in the order of magnitude of $+10^9$ dynes/cm$^2$ after heating for high temperature sputtering. To this end, as shown in FIG. 5, for example, the gas pressure is set in the order of magnitude of $10^{-3}$ Torr. With respect to the second ITO film formed at high temperatures, it should be taken into account that the stress in tension of the first ITO film is in the order of magnitude of $+10^9$ dynes/cm$^2$, the film-forming conditions are so set that the stress in compression of the resultant film is in the order of magnitude of $-10^9$ dynes/cm$^2$. With the case of FIG. 3, for example, the sputtering gas pressure conditions are set at $10^{-3}$ Torr.

According to the invention, the stress in compression produced in the second ITO film formed at high temperatures are counterbalanced with the stress in tension of the first ITO film formed at normal temperatures. In addition, the stress of the $SiO_2$ film is so set as to be close to zero. Eventually, the film stress of the builtup structure can approach to zero. More particularly, the addition of the first ITO film formed at normal temperatures (or generally formed at low temperatures) allows it to serves as a relaxing layer for the stress. Since the relaxing layer is made of ITO, adhesion to the ITO film formed at high temperatures is, of course, good. No adverse influence is produced using such a double-layer structure.

Figure 6:
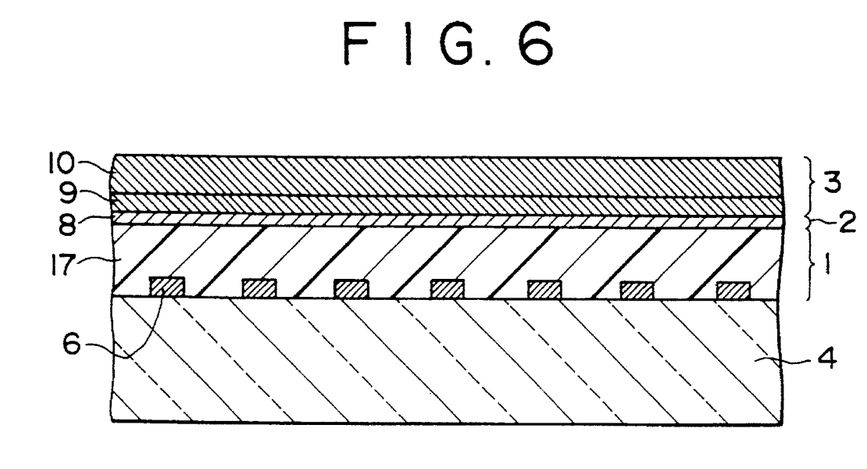
FIG. 6 is a schematic sectional view of an electrode substrate for display devices according to another embodiment of the invention.

FIG. 6 shows a schematic sectional view showing an electrode substrate for display device according to a second embodiment of the invention wherein the electrode substrate is applied as a counter substrate of a mono-color active matrix liquid crystal display device. In the figure, like reference numerals as in FIG. 1 indicate like members or parts. In this embodiment, any color filter film is not formed on the surface of a glass substrate 4 but a black mask 6 alone is formed in a desired pattern. The black mask 6 is provided in order to shut off regions other than pixel regions and is made, for example, of a film of a metal such as Cr or Mo. An insulating film 17 used as a resin layer 1 is formed on the mask 6. On the insulating film 17 are formed a first ITO film 9 and a second ITO film 10 through a $SiO_2$ film 8. The insulating film 17 functions to electrically insulate the black mask 6 made of the metal film and the ITO films from each other. In this embodiment, the $SiO_2$ film 8 is formed by sputtering, followed by sputtering at low temperatures to form the first ITO film 9 and sputtering at high temperatures to form the second ITO film 10, by which the stresses of the films can be relaxed.

Figure 7:
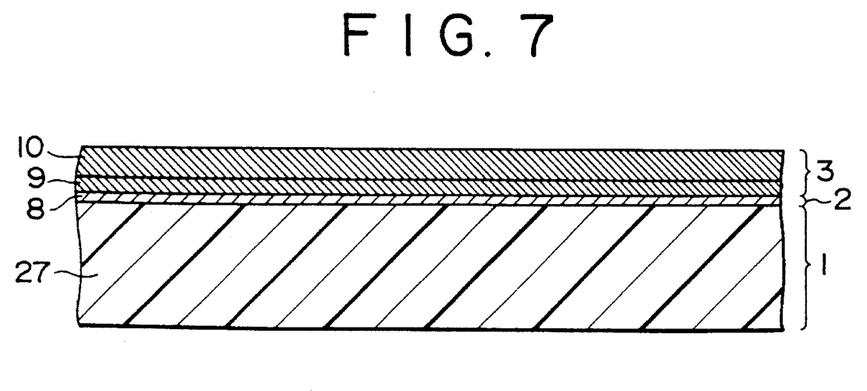
FIG. 7 is a schematic sectional view of an electrode substrate for display devices according to a further embodiment of the invention.

FIG. 7 shows a schematic sectional view of an electrode substrate for display devices according to a third embodiment of the invention wherein like reference numerals as in FIG. 1 indicate like members or parts. In this embodiment, the electrode substrate is formed of only a builtup structure wherein a resin layer 1, an underlying layer 2 and a conductive layer 3 are superposed in this order. The resin layer 1 is made of a thick plastic substrate 27 and thus, the electrode substrate has a so-called plastic electrode substrate structure. On comparison with known glass electrode substrates, the plastic electrode substrate is lighter in weight and easier in handling, with good economy.

As will be apparent from the foregoing, the electrode substrate according to the invention has a first ITO film formed at normal temperatures provided between an underlying $SiO_2$ film and a second ITO film formed at high temperatures. As a results, the relaxation of the stresses becomes possible, thereby preventing the ITO film or films from being separated or cracked. When the sputtering gas pressure is set at a level in the order of magnitude of $10^{-3}$ Torr., the formation of ITO films becomes possible over wide ranges of low and high temperature sputtering conditions. The resultant electrode substrate structure may be applied not only to counter substrates for matrix liquid crystal display devices, but also those structures wherein an ITO film is formed on a resin layer in a pattern.

What is claimed is:

1. An electrode substrate which is adapted for use in a liquid crystal display device, the substrate comprising:

a resin layer a $SiO_2$ underlying layer formed on said resin layer by sputtering; and a conductive layer formed on the underlying layer in a pattern, the conductive layer having a double-layer structure which includes a first indium tin oxide film formed by low temperature sputtering and a second indium tin oxide film formed by high temperature sputtering.

2. An electrode substrate according to claim 1, wherein said $SiO_2$ film has an internal stress substantially equal to zero, said first indium tin oxide film has a given internal stress in tension, and said second indium tin oxide film has an internal stress in compression counterbalanced with said internal stress in tension.

3. An electrode substrate according to claim 1, further comprising a glass substrate and color filter layer formed on said glass substrate wherein said resin layer serves as a flattened film covering said color filter layer therewith.

4. An electrode substrate according to claim 1, further comprising a glass substrate having a metal film serving as a black mask wherein said resin layer serves as an insulating film covering said metal film therewith.

5. An electrode substrate according to claim 1, wherein said resin layer consists of a thick plastic substrate.

6. A method for making an electrode substrate for display devices, the method comprising the steps of:

forming an underlying layer made of a $SiO_2$ film on a resin layer by sputtering;

forming a first indium tin oxide film on said underlying layer by low temperature sputtering;

further forming a second indium tin oxide film on the first indium tin oxide film by high temperature sputtering, thereby forming a conductive layer having a double-layered structure; and subjecting the conductive layer to patterning in a desired form to form transparent electrodes.

7. A method according to claim 6, wherein the low temperature and high temperature sputterings are performed under film-forming gas pressure conditions in the order of magnitude of $10^{-3}$ Torr.

8. A method according to claim 6, wherein the low temperature sputtering is performed at normal temperatures and the high temperature sputtering is performed at approximately 250° C.

* * * * *